ced May 9, 1961

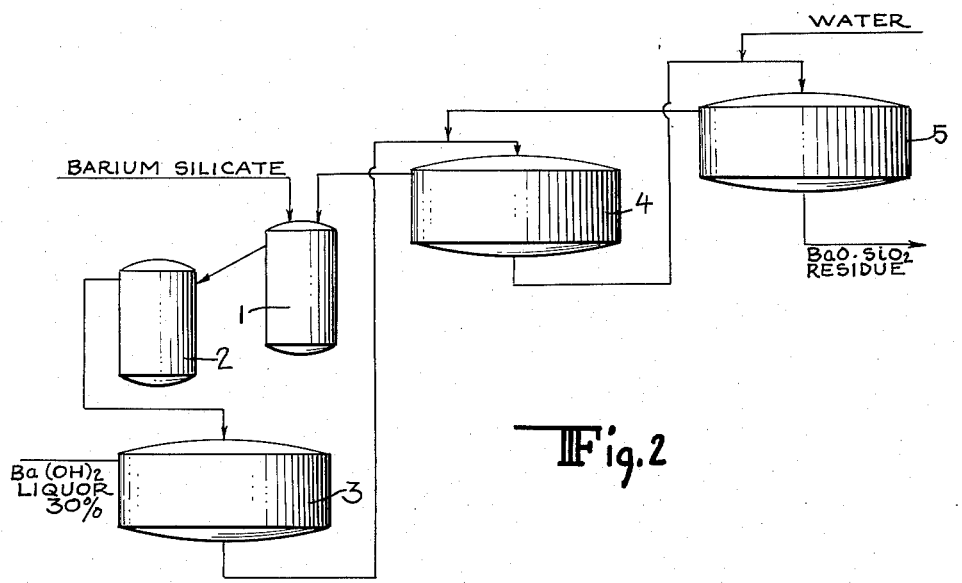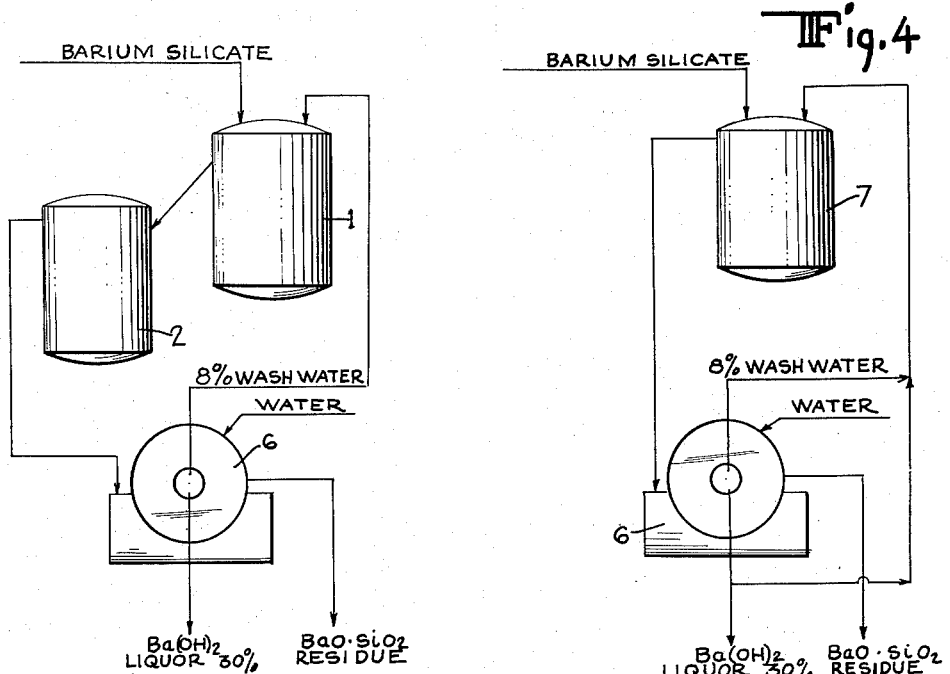

2,983,579
LEACHING OF BARIUM SILICATES CONTAINING WATER-SOLUBLE BARIUM SALTS

James G. Coma, Vancouver, Wash., and Manley C. Marcellus, Maplewood, Minn., assignors to Food Machinery and Chemical Corporation, New York, N.Y., a corporation of Delaware Filed Oct. 20, 1958, Ser. No. 768,208

4 Claims. (Cl. 23—186)

This invention relates to an improved process of recovering water-soluble barium values from a barium silicate containing water-soluble barium values and having a barium to silicon ratio of greater than 1.1 to 1.

Barium silicate containing water-soluble barium values is prepared by decomposing an insoluble barium containing compound, such as barium sulfate, barium carbonate, barium sulfite, etc., with a source of silicon dioxide by heating. If an excess of barium over a barium to silicon ratio of 1.1 to 1 is utilized in the feed material, a barium silicate will result which contains the excess barium in a form that is water-soluble and which is leachable by water with recovery of a barium hydroxide solution. A theoretical equation for this reaction with $BaSO_4$ as a starting material is as follows:

(1) $2BaSO_4 + SiO_2 \rightarrow 2BaO.SiO_2 + 2SO_2 + O_2$
(2) $2BaO.SiO_2 + H_2O \rightarrow Ba(OH)_2 + BaO.SiO_2$ The $BaO.SiO_2$ residue may be recycled as a source of silicon dioxide as follows:

(3) $BaSO_4 + BaO.SiO_2 \rightarrow 2BaO.SiO_2 + SO_2 + \frac{1}{2}O_2$

Varying amounts of $BaSO_4$ may be used in excess of the 2 to 1 ratio of barium to silicon shown with increasing yields of water-soluble barium values. However, if amounts in excess of a 2.7 to 1 ratio are used, difficulties are encountered in that the barium silicate produced undergoes sintering or fusion which results in a product which is difficult to leach. Inasmuch as the insoluble barium silicate can be recycled, optimum yields of barium silicate containing water-soluble barium values can be obtained without the use of high barium to silicon ratios. We have also found that in leaching barium silicate prepared from barium containing compounds and containing excess barium over a 1 to 1 barium to silicon ratio, it is impossible to obtain theoretical yields due to the formation of some water-insoluble salts with the impurities present. The water-insoluble barium silicate after leaching contains a 1.1 to 1 barium to silicon ratio. This water-insoluble barium is also recoverable by recycling.

The reaction to produce barium silicate containing water-soluble barium values from other insoluble barium containing compounds is similar as shown in the following equations utilizing barium carbonate and barium sulfite as starting material.

(4) $2BaCO_3 + SiO_2 \rightarrow 2BaO.SiO_2 + 2CO_2$
(5) $2BaSO_3 + SiO_2 \rightarrow 2BaO.SiO_2 + 2SO_2$ The water-soluble barium values in a barium silicate containing excess barium over a 1.1 to 1 barium to silicon ratio is readily leachable in water with the formation of a barium hydroxide solution. However, this leaching by water, even hot water, proceeds at a slow rate and many hours are required to completely remove the water-soluble barium values. In addition, we have found that the agglomerated particles of water-insoluble barium silicate as produced in heating tend to break down into finely divided particles upon long standing in water with agitation, causing a marked reduction in the filtration rate. Both of these related factors greatly increase the cost of recovery of water-soluble barium values in a commercial operation.

An object of our invention is to shorten the time required to fully leach all water-soluble barium values from a barium silicate containing barium in excess of a 1.1 to 1 barium to silicon ratio.

Another object of our invention is to develop a commerical method of extracting barium hydroxide from barium silicate by leaching in a hot aqueous solution containing at least a 10% initial BaO concentration.

A further object of our invention is to completely leach water-soluble barium values from barium silicate without breaking down the barium silicate agglomerated particles.

We have found that water-soluble barium values may be readily and completely leached from a barium silicate containing barium to silicon ratio in excess of 1.1 to 1 in approximately 0.5 to 4 hours by the use of a barium hydroxide leach liquor containing at least a 15% initial BaO concentration by weight and 4 to 12 hours for a leach liquor containing a 10% initial BaO concentration. This compares to a rate of 12 hours to several days for hot water. This greatly increased rate of solution in concentrated barium hydroxide solutions is directly contrary to accepted theories. In view of the law of mass-action and according to the theory on diffusional driving forces, a decrease in leaching rate with increased concentration of barium hydroxide in the leach liquor would be expected.

In the accompanying drawings:

Fig. 2 is a flow sheet of a continuous leach system utilizing thickeners for liquid-solid separation.

Fig. 3 is a flow sheet of a continuous leach system utilizing thickeners for liquid-solid separation.

Fig. 4 is a flow sheet of a batch leach system with a recycle of product liquor.

Figure 1:
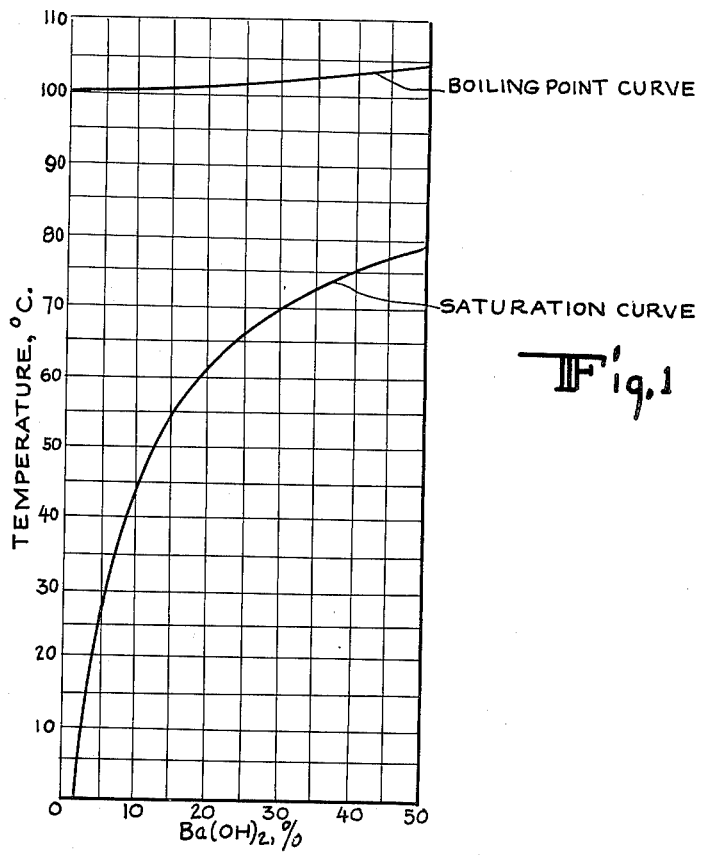
Fig. 1 is a plot of the saturation and boiling points of $Ba(OH)_2$ solutions versus temperature.

Barium silicate containing water-soluble barium values, for convenience hereinafter sometimes called polybarium silicate, is leached according to our invention by a solution containing at least 10% initial BaO at elevated temperatures and atmospheric pressure. The preferred temperature is about 80 to 90° C., the extreme limits being limited by the saturation temperature and the boiling temperature. Fig. 1 shows the saturation and boiling temperatures at various concentrations.

The leaching time is related to the concentration of the liquor, according to the practice of this invention. This is particularly true of those polybarium silicates which are difficult to leach under ordinary circumstances. Such silicates, when leached in hot water, may require from 12 hours to several days to dissolve essentially all the BaO in excess of that combined with silica in the insoluble monobarium silicate. By using initially a 10% $Ba(OH)_2$ solution the leaching time is reduced to the range 1 to 12 hours for corresponding materials, and with a 20% initial $Ba(OH)_2$ solution, the leaching time is about ½ to 4 hours.

The preferred concentration is 20% or more $Ba(OH)_2$, corresponding to 18% or more BaO, which enables the leaching of a wide variety of materials at a reasonable rate. The leaching may be conducted either batchwise or continuously. Batchwise leaching is conducted preferably in a solution of about 20% $Ba(OH)_2$ proportioned so that the barium hydroxide concentration after leaching is about 30%. The initial 20% barium hydroxide concentration is obtained by fortifying a dilute liquor from a filter or countercurrent wash system with recycled 30% liquor. Fig. 4 is a flow diagram of this system. Continuous leaching is conducted similarly except that an equilibrium concentration is reached in the leach system in excess of 20% $Ba(OH)_2$ so that recycle of product liquor is not required. Continuous leach systems are illustrated in Figs. 2 and 3.

In Fig. 2 a flow diagram is shown of a continuous leach system utilizing thickeners for liquid-solid separation. Polybarium silicate is continuously added to leach tank 1, in which the slurry is vigorously agitated. The BaO concentration in leach tank 1 is maintained at 22.3% by weight corresponding to a 25% $Ba(OH)_2$ concentration by continuous introduction of overflow solution from the thickeners 4 and 5 into leach tank 1. This overflow solution has a $Ba(OH)_2$ concentration of about 8%. The overflow from leach tank 1 which consists in a barium hydroxide solution containing 25% $Ba(OH)_2$ and having suspended therein partially leached polybarium silicate is conducted to leach tank 2 where the leaching is completed. The $Ba(OH)_2$ concentration in leach tank 2 is maintained at 30%. The total residence time for both leach tanks is adjusted to about 1 hour. The overflow from leach tank 2 consisting of leached barium silicate suspended in a barium hydroxide liquor containing 30% $Ba(OH)_2$ is conducted to thickener 3 where the solid leached barium silicate is separated from the supernatant 30% $Ba(OH)_2$ solution. The overflow 30% $Ba(OH)_2$ solution is utilized directly or it can be further processed. The bottoms from the thickener 3 consisting of moist leached barium silicate is conveyed to thickeners 4 and 5 where it is washed counter currently with water to recover the barium hydroxide solution adhering to the moist material. The washed $BaO.SiO_2$ residue can be recycled to the barium silicate production process for further production of polybarium silicate by heating the recycle residue with barium sulfate, barium carbonate, barium sulfite, etc., according to Equation 3.

In Fig. 3 an alternative continuous leach system utilizing a filter for liquid-solid separation is illustrated. The polybarium silicate is leached in leach tanks 1 and 2 similar to the embodiment disclosed in Fig. 2. The overflow from leach tank 2, however, is conducted to a filter 6 where the barium hydroxide solution is separated from the moist leached barium silicate. This moist leached material is washed with water to remove the adhering concentrated barium hydroxide solution. The resulting wash water has an 8% $Ba(OH)_2$ concentration and is passed to leach tank 1, as shown.

In Fig. 4 a batch leaching system is illustrated utilizing a partial recycle of the product liquor to obtain a 20% $Ba(OH)_2$ leach liquor (corresponding to an 18% BaO concentration). Polybarium silicate and a 20% $Ba(OH)_2$ leach liquor are fed into the batch leach tank 7. The contents of the tank are agitated for about one hour to effect leaching and the solution containing leached barium silicate and about a 30% $Ba(OH)_2$ solution is filtered through a filter 6 to separate the barium hydroxide solution from the barium silicate residue. This residue is washed with water to remove the adhering concentrated barium hydroxide solution. The resulting wash water has an 8% $(BaOH)_2$ concentration and is mixed with sufficient 30% $Ba(OH)_2$ solution to give a 20% $Ba(OH)_2$ solution which is returned to batch leach tank 7 for further leaching of a new batch of polybarium silicate.

The equipment utilized for the leaching operations is conventional and any commercial apparatus can be used. The filter preferred is a rotary vacuum filter. It is desirable to operate the leaching process in an atmosphere free of carbon dioxide to avoid formation of barium carbonate.

Figure 5:
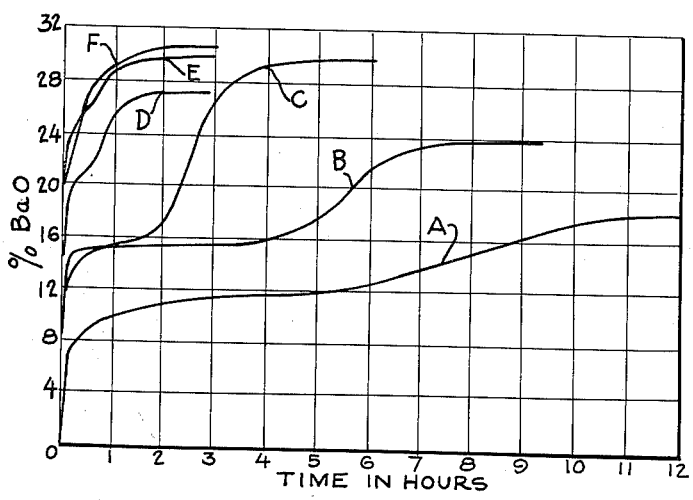
Fig. 5 is a plot of the leaching rates at various initial BaO concentrations.

In Fig. 5 the various leaching rates for polybarium silicate at varying concentrations are shown. This data was obtained by adding a 600 gram sample of polybarium silicate having either a 2.5 or a 2.7 Ba/Si ratio to a closed leaching vessel. The calculated quantities of water and $Ba(OH)_2.8H_2O$ necessary to yield the desired initial and final liquor concentrations were first placed in the vessel. When this initial barium hydroxide solution reached the desired temperature, the barium silicate was added and the time noted. Samples were taken at 6, 30 and 60 minutes, and thence at one hour intervals until equilibrium was obtained. After weighing, the samples were titrated with 1 N HCl to phenolphthalein and methyl orange end points, from which the concentration of BaO in solution was calculated. After each sampling, water was added to the leaching vessel equal to that removed in the sample. At the end of the leaching test the leached slurry was filtered through a steam-heated Buchner funnel into a 4 liter flask. A small quantity of water (approximately 300 ml.) was used as a displacement wash to remove the concentrated liquor contained in the filter cake and this filtrate was added to the same 4 liter flask. The filter cake was then washed with hot water equal to that used for the original make-up of the batch, and the weak filtrate obtained was collected in a second 4 liter flask. The strong and weak filtrates were each weighed and analyzed for percent BaO in solution. Determinations were made of filtration rate and of the volume of and moisture in the filter cake. In Table I below is presented the results of a series of leaching tests from which the curves of Fig. 5 were plotted.

TABLE I

*Polybarium silicate leach tests*

|  | A | B | C | D | E | F |
|---|---|---|---|---|---|---|
| Initial Liquor Conc., Percent BaO | 0 | 10 | 10 | 15 | 20 | 20 |
| Ba/Si Ratio | 2.7 | 2.5 | 2.7 | 2.5 | 2.5 | 2.7 |
| | Percent BaO in Liquor | | | | | |
| Time in Hours: | | | | | | |
| 0 | 0 | 10.2 | 10.0 | 15.1 | 20.6 | 20 |
| 0.1 | 7.2 | 14.5 | 13.4 | 19.9 | 23.3 | 21.7 |
| 0.5 | 9.0 | 15.0 | 14.8 | 21.4 | 25.9 | 27.9 |
| 1.0 | 10.2 | 15.3 | 15.1 | 25.9 | 29.4 | 29.0 |
| 2.0 | 11.0 | 15.4 | 16.6 | 27.0 | 30.0 | 30.4 |
| 3.0 | 11.5 | 15.5 | 27.8 |  | 29.7 | 30.5 |
| 4.0 | 12.1 | 16.0 | 29.2 |  |  |  |
| 5.0 | 12.2 | 17.6 | 29.8 |  |  |  |
| 6.0 | 12.8 | 22.0 | 29.8 |  |  |  |
| 7.0 | 14.3 | 23.7 |  |  |  |  |
| 8.0 | 15.2 | 23.9 |  |  |  |  |
| 9.0 | 16.7 | 23.7 |  |  |  |  |
| 10.0 | 18.0 |  |  |  |  |  |
| 11.0 | 18.6 |  |  |  |  |  |
| 12.0 |  |  |  |  |  |  |
| 24.0 | 18.4 |  | 29.2 |  |  |  |
| Time to 90% Equil. | 8.7 | 6.1 | 3.2 | 1.0 | 0.8 | 1.0 |

From Fig. 5 it can be seen that in leaching with water (Curve A), a very fast initial leaching rate occurs followed by a very slow rate and after 6 hours a moderate increase in the rate of leaching is observed. When utilizing a 10% BaO solution as the initial leach liquid (Curves B and C), the same type of curve results although totally unexpectedly the rate to equilibrium has decreased considerably. When a stronger leach liquor, 15% to 20% initial BaO content is utilized, the slope of the curves changes markedly and the length of time to completely leach soluble barium oxide from the polybarium silicate is decreased even more startlingly and unexpectedly. It can be seen that use of a 15% BaO solution as the initial leach liquid (Curve D) causes the slowdown of the leaching rate to almost completely disappear and at a 20% BaO initial leach liquid (Curves E and F), no lag in leaching rate is observed.

While we are not certain as to the reasons for the unexpected decrease in the time required for leaching water-soluble barium values from polybarium silicate by the use of at least a 10% initial BaO concentration leach liquid, we believe that reaction takes the following course:

(6) $Ba_2SiO_4 + 2H_2O \rightleftarrows BaH_2SiO_4 + Ba^{++} + 2(OH)^-$

This reaction should proceed to the left in the presence of a high Ba$^{++}$ or (OH)$^-$ concentration according to the law of mass action. However, as noted above this does not occur and presence of a high Ba$^{++}$ concentration actually helps speed the leaching rate. If further hydrolysis of the BaH$_2$SiO$_4$ occurs in dilute solutions, a gel can possibly form according to the following equation:

(7) BaH$_2$SiO$_4$+2H$_2$O$\rightleftharpoons$H$_4$SiO$_4$ gel +Ba$^{++}$+2(OH)$^-$ Thus it can be seen according to Equation 7 that in the presence of excess water the monobarium silicate would tend to lose barium and form silica gel. This gel would result from the condensation of orthosilicate ions having hydroxyl groups available for dehydration to Si—O—Si bonds. It would not be necessary for all barium to be removed for such a condensation to occur. Actually, there would be a tendency toward condensation any time the Ba/Si ratio dropped below 2/1.

The presence of excess Ba$^{++}$ in solution would tend to drive Equation 7 to the left and would decrease the tendency toward condensation. This would favor discrete ion formation which would facilitate crystallization of BaH$_2$SiO$_4$. It would oppose gel formation. It is reasonable to expect a gelatinous system to be somewhat sluggish in reactions as compared with freely moving solutions. If a gelatinous layer is formed around a dissolving or decomposing particle, one can expect this particle to react more slowly than if its surface were continually washed by fresh solution. Such a mechanism could explain the slow leaching rate of dibarium silicate in dilute aqueous systems. If Equation 7 were more rapid than Equation 6, the particles would always be coated with gel in dilute aqueous systems. In solutions concentrated with respect to Ba$^{++}$, the gel would be removed from the surface of the particles allowing a faster penetration of the particles by water and a faster rate of solution of water-soluble barium values.

The following examples illustrate our invention. It is understood, however, that these examples are illustrative only and to enable one skilled in the art to practice our invention, they are not to be considered as limiting in any fashion the scope of our invention.

The concentrations are reported as "percent BaO," the Ba(OH)$_2$ concentrations can be obtained by multiplying this value by the factor 1.12.

EXAMPLE I

A barium silicate prepared from high grade barite and silica, fired at 1535° C. to decompose the barium sulfate had a composition of approximately 88% 2.5BaO.SiO$_2$. This was leached in water, 10% BaO solution and 20% BaO solution, with the following results:

|  | Water | 10% BaO | 20% BaO |
|---|---|---|---|
| Initial Concentration, Percent BaO | 0 | 10 | 20 |
| Final Concentration, Percent BaO | 18.6 |  | 30.4 |
| Time for Complete Leaching, hr | 11 | 4.5 | 2 |
| Time for 90% Leaching, hr | 9 | 3.5 | 0.7 |

EXAMPLE II

A barium silicate prepared from high grade barite and monobarium silicate leach residue, fired at 1350° C. had a composition of approximately 79% 2.2BaO.SiO$_2$. This was leached in concentrated Ba(OH)$_2$ solutions containing 10% and 20% BaO (11.5% and 22.5% Ba(OH)$_2$). The leaching times were as follows:

|  | 10% BaO | 20% BaO |
|---|---|---|
| Time for complete leaching, hr | 11 | 3 |
| Time for 90% leaching, hr | 10 | 2 |

EXAMPLE III

A barium silicate, similar to Example I, but fired to 1400° C. had a composition approximately 90% 2.3BaO.SiO$_2$. This material leached completely in 6–7 hours in 10% BaO solution and in 1 hour in a 20% BaO solution.

The above examples are illustrative only and are not to be considered as limitations of our invention, the scope of which is to be determined by the appended claims.

We claim:

1. A process for extracting water-soluble barium values from a barium silicate having a barium to silicon ratio in excess of 1.1 to 1 which comprises treating said barium silicate at a temperature between 65° C. and the boiling point of the solution with an aqueous barium hydroxide solution containing at least a 15% initial BaO concentration.

2. A process for extracting water-soluble barium values from a barium silicate having a barium to silicon ratio in excess of 1.1 to 1 which comprises treating said barium silicate at a temperature between 65° C. and the boiling point of the solution with an aqueous barium hydroxide solution containing at least a 10% initial BaO concentration.

3. A process for extracting barium hydroxide from a polybarium silicate which comprises contacting said polybarium silicate at about 80° C. with an aqueous barium hydroxide solution containing an initial concentration of about 20% by weight of BaO for a time sufficient to completely extract all water-soluble barium values in said polybarium silicate as barium hydroxide.

4. The process of claim 2 carried out in a continuous manner.

References Cited in the file of this patent

UNITED STATES PATENTS 1,799,989     Rusberg et al.     Apr. 7, 1931